(12) United States Patent
Zhou

(10) Patent No.: US 10,502,890 B2
(45) Date of Patent: Dec. 10, 2019

(54) DISPLAY DEVICE AND WALL-MOUNTED HEAT DISSIPATION MECHANISM THEREOF

(71) Applicant: HUIZHOU CHINA STAR OPTOELECTRONICS TECHNOLOGY CO., LTD., Huizhou Guangdong (CN)

(72) Inventor: Mingjun Zhou, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 15/909,555

(22) Filed: Mar. 1, 2018

(65) Prior Publication Data

US 2019/0204500 A1 Jul. 4, 2019

Related U.S. Application Data

(63) Continuation of application No. PCT/CN2018/073090, filed on Jan. 17, 2018.

(30) Foreign Application Priority Data

Dec. 29, 2017 (CN) .......................... 2017 1 1486942

(51) Int. Cl.
*F21V 8/00* (2006.01)
*F21V 29/58* (2015.01)
(Continued)

(52) U.S. Cl.
CPC ............ *G02B 6/0085* (2013.01); *F21V 29/59* (2015.01); *F21V 29/673* (2015.01); *F21V 29/74* (2015.01);
(Continued)

(58) Field of Classification Search
CPC ............ G02B 6/0085; G02F 1/133385; G02F 2001/133628; G02F 2001/36; H05K 7/209

See application file for complete search history.

(56) References Cited

U.S. PATENT DOCUMENTS 5,943,801 A 8/1999 Wilkinson
6,327,144 B1 12/2001 May
(Continued)

FOREIGN PATENT DOCUMENTS

CN 101042231 A 9/2007
CN 101188920 5/2008
(Continued)

*Primary Examiner* — Alexander K Garlen
(74) *Attorney, Agent, or Firm* — Hemisphere Law, PLLC; Zhigang Ma

(57) ABSTRACT

The present disclosure discloses a display device and a mechanism thereof, the wall-mounted heat dissipation mechanism includes: a heat dissipation plate including a longitudinal plate and a transverse plate bended to each other, a LED light bar attached to an inner surface of the longitudinal plate, the transverse plate is arranged opposite to a back surface of the light guide plate; a hanger including a first hanger fixed on a hanging wall and two second hangers respectively fixed on two ends of the first hanger at intervals, the second hanger is configured to detachably connect with the heat dissipation plate; and a heat dissipation mechanism fixed on the first hanger and disposed between the two second hangers, the heat dissipation mechanism being in surface contact with a back surface of the heat dissipation plate. The bulky part of the mechanism is integrated into the hanger structure of the display device.

20 Claims, 2 Drawing Sheets

(51) Int. Cl.
*F21V 29/67* (2015.01)
*F21V 29/74* (2015.01)
*G02F 1/1335* (2006.01)

(52) U.S. Cl.
CPC ........... *G02B 6/009* (2013.01); *G02B 6/0091* (2013.01); *G02F 2001/133628* (2013.01)

(56) References Cited

U.S. PATENT DOCUMENTS

| | | | | |
|---|---|---|---|---|
| 7,956,979 | B2* | 6/2011 | Oh | G02F 1/133385 349/161 |
| 2006/0070280 | A1* | 4/2006 | Yamamura | G06F 1/1601 40/564 |
| 2008/0170400 | A1* | 7/2008 | Maruyama | G02F 1/133603 362/294 |
| 2008/0285290 | A1* | 11/2008 | Ohashi | G02B 6/0085 362/373 |
| 2010/0027296 | A1* | 2/2010 | Hamada | F21V 29/02 362/632 |
| 2011/0310555 | A1* | 12/2011 | Yamamoto | H05K 7/20963 361/688 |
| 2012/0020114 | A1* | 1/2012 | Miyamoto | G02B 6/0085 362/612 |
| 2015/0009419 | A1* | 1/2015 | Hosoki | G02F 1/133615 348/794 |
| 2015/0192729 | A1* | 7/2015 | Hosoki | G02F 1/133308 348/794 |
| 2016/0186944 | A1* | 6/2016 | Park | G09F 13/00 362/97.1 |
| 2016/0238877 | A1* | 8/2016 | Wagner | G02F 1/133308 |

FOREIGN PATENT DOCUMENTS

| | | |
|---|---|---|
| CN | 201166759 | 12/2008 |
| CN | 201348703 | 11/2009 |
| CN | 102736693 A | 10/2012 |
| CN | 204929025 | 12/2015 |
| CN | 106598178 | 4/2017 |
| CN | 107387995 | 11/2017 |

* cited by examiner

DISPLAY DEVICE AND WALL-MOUNTED HEAT DISSIPATION MECHANISM THEREOF

RELATED APPLICATIONS

The present application is a National Phase of International Application Number PCT/CN2018/073090, filed Jan. 17, 2018, and claims the priority of China Application 201711486942.5, filed Dec. 29, 2017.

FIELD OF THE DISCLOSURE

The present disclosure relates to a display technology field, and more particularly to a display device and a wall-mounted heat dissipation mechanism thereof.

BACKGROUND OF THE DISCLOSURE

Since the liquid crystal itself does not emit light, the backlight module can be described as a key component of a liquid crystal display (LCD) panel. The main function of the backlight module is to supply a light source with sufficient luminance and uniform distribution so that the LCD panel can display images normally. Demand for backlit modules and their associated components continues to grow as LCD panels are already widely used in a wide range of electronic devices with growth potential, such as monitors, notebooks, digital cameras, projectors, and more. Generally, the backlight module can be divided into a light source and a light source from the direct-type backlight module just under the display panel and the edge-type backlight module with the light source from the side of the display panel according to the position of the light source. Wherein, since the edge-type backlight module provides the light source generator on the side of the display panel, the volume and manufacturing cost of the liquid crystal display can be reduced, and the light source generator can be applied to small-sized electrical products.

The main heat dissipation method of the existing backlight module is to conduct the heat to the back plate and dissipate the heat to the environment by utilizing the surface area of the back plate itself in contact with the outside world. However, the above surface area is often limited by the size of the display panel of the backlight module to affect its heat dissipation efficiency. As a result, the backlight module overheats its light source due to poor heat dissipation, resulting in shortening the service life of the backlight module and reducing the luminous efficiency thereof. In order to improve the heat dissipation efficiency, some manufacturers also manufacture a large number of heat dissipation fins on the back of the display to dissipate heat. By increasing the heat dissipation fins, the heat dissipation efficiency is obviously improved. However, this also directly causes the display device to have a greater thickness and an overall heavy weight, which is not in line with the flimsy development trend of the current television sets.

SUMMARY OF THE DISCLOSURE

In view of the deficiencies of the prior art, the present disclosure provides a display device and a wall-mounted heat dissipation mechanism thereof, under the premise of not increasing the total volume of the display device, the space redundancy of the display device is fully utilized, and the heat dissipation system is well designed so that the product is slim and beautiful.

In order to achieve the above object, the present disclosure adopts the following technical solutions.

A wall-mounted heat dissipation mechanism for a display device, wherein an LED light bar is disposed at a light incident end of a light guide plate and opposite to the light guide plate, and the wall-mounted heat dissipation mechanism includes:

a heat dissipation plate including a longitudinal plate and a transverse plate bended to each other, the LED light bar is attached to an inner surface of the longitudinal plate, and the transverse plate is arranged opposite to a back surface of the light guide plate;

a hanger including a first hanger fixed on a hanging wall and two second hangers respectively fixed on two ends of the first hanger at intervals, the two second hangers are configured to detachably connect with the heat dissipation plate; and a heat dissipation mechanism fixed on the first hanger and disposed between the two second hangers, the heat dissipation mechanism being in surface contact with a back surface of the heat dissipation plate.

As one of the embodiments, the heat dissipation mechanism includes a plurality of heat dissipation fins arranged at intervals, and the heat dissipation fins are in surface contact with the back surface of the heat dissipation plate.

As one of the embodiments, a portion of the first hanger on which the heat dissipation mechanism is fixed is hollowed out.

As one of the embodiments, the heat dissipation mechanism further includes a heat dissipation fan for exhausting air in a direction away from the heat dissipation plate.

As one of the embodiments, the plurality of heat dissipation fins surround a periphery of the heat dissipation fan.

As one of the embodiments, the wall-mounted heat dissipation mechanism further includes a first water cooling pipe and a water pump connected to each other, the first water cooling pipe is bent back and forth to cover a surface of the longitudinal plate facing away from the LED light bar and is configured to supply cooling liquid to flow through the longitudinal plate to take heat of the longitudinal plate away when the water pump supplying the cooling liquid.

As one of the embodiments, the heat dissipation mechanism further includes a second water cooling pipe and a third water cooling pipe connected with the first water cooling pipe, the second water cooling pipe and the third water cooling pipe are reciprocally bent and disposed between the two second hangers, respectively for conveying high-temperature cooling liquid from a side of the longitudinal plate to a side of the first water cooling pipe, and for conveying low-temperature cooling liquid from the side of the first water cooling pipe to the side of the longitudinal plate.

As one of the embodiments, the second water cooling pipe and the third water cooling pipe respectively extend from a corresponding side of the second hanger near two sides thereof toward a middle portion thereof.

Another object of the present disclosure is to provide a display device including a light guide plate, an LED light bar and a wall-mounted heat dissipation mechanism of the display device.

As one of the embodiments, the display device further includes a back plate, and the back plate is sandwiched between the light guide plate and the transverse plate.

By integrating the bulky part of the wall-mounted heat dissipation mechanism into the hanger structure of the display device, the present disclosure makes full use of the space redundancy possessed by the hanger structure of the display device itself. Without increasing the total volume of the entire display device, it not only places various large heat dissipation structures well, but also ensures that the display structure of the display device is slim and beautiful, and increases the competitiveness of the product.

DETAILED DESCRIPTION OF THE PREFERRED EMBODIMENTS

In order to make the objectives, technical solutions and advantages of the present disclosure more comprehensible, the present disclosure is further described in detail below with reference to the accompanying drawings and embodiments. It should be understood that the specific embodiments described herein are merely used to explain the present disclosure, and are not intended to limit the present disclosure.

Figure 1:
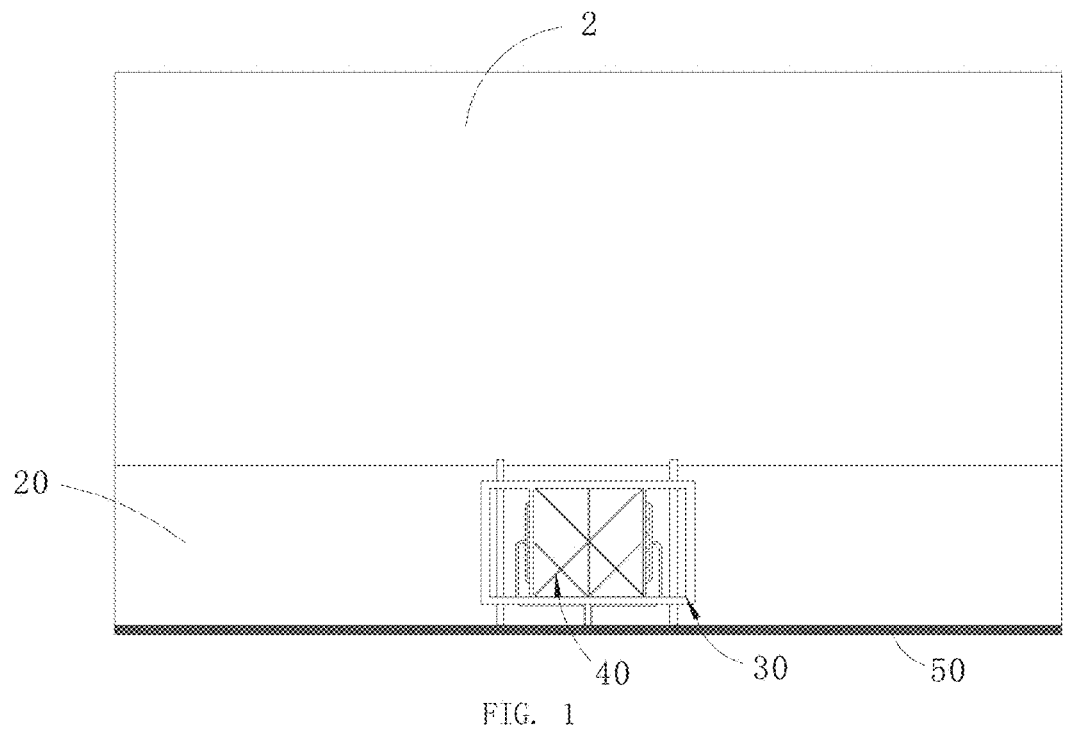
FIG. 1 is a schematic diagram of the back of the display device according to the embodiment of the present disclosure.
Figure 2:
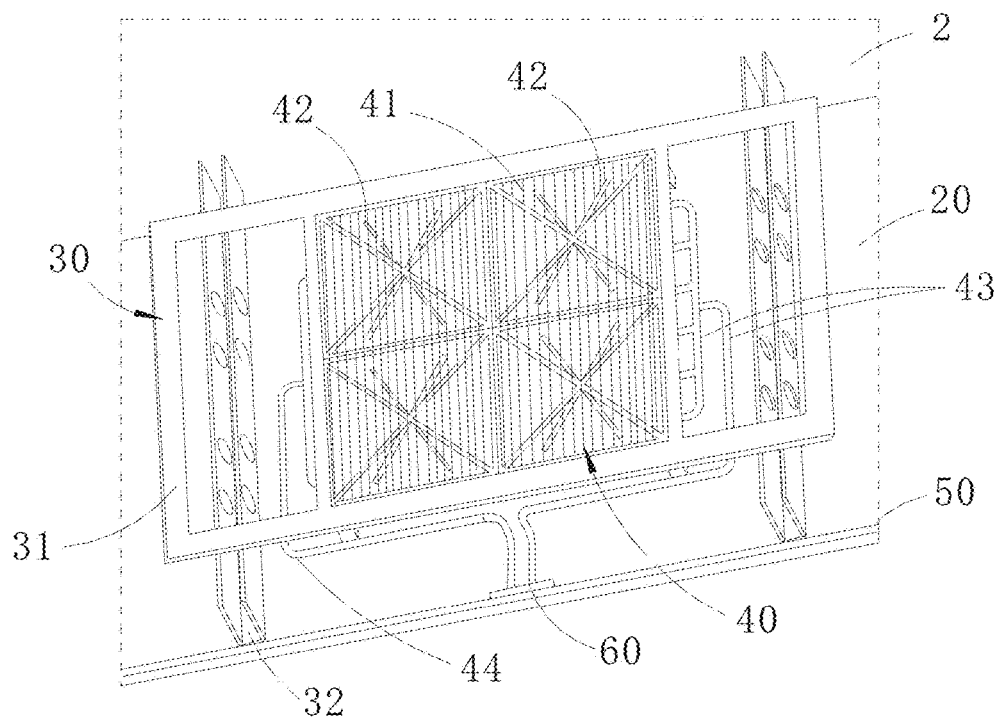
FIG. 2 is a partial enlarged diagram of the back of the display device according to the embodiment of the present disclosure.
Figure 3:
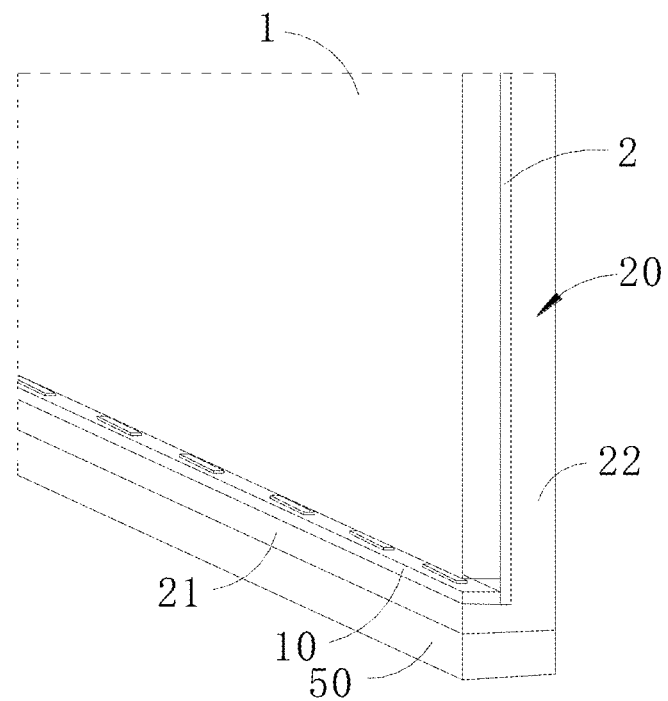
FIG. 3 is a partial structure diagram of the display device according to the embodiment of the present disclosure.

Referring to FIG. 1 and FIG. 3, the display device of the present embodiment mainly includes a light guide plate 1, an LED light bar 10 and a wall-mounted heat dissipation mechanism. The wall-mounted heat dissipation mechanism mainly includes a heat dissipation plate 20 and a hanger 30. The LED light bar 10 is disposed at the light incident end of the light guide plate 1 and opposite to the light guide plate 1. The light emitted by the LED light bar 10 enters the light guide plate 1 from the side surface, is evenly processed by the light guide plate 1, and then emitted from the top surface thereof as a backlight source. The hanger 30, the heat dissipation plate 20, and the LED light bar 10 are disposed on the light incident side of the light guide plate 1. It is understandable that the display device further includes a display panel, an optical film, and the like. In the present embodiment, the structures of the display panel, the optical film and the like in the display device are not described in detail herein.

The heat dissipation plate 20 is disposed beside the LED light bar 10, the LED light bar 10 is attached to the inner side of the heat dissipation plate 20 and faces the light incident end of the light guide plate 1. The heat dissipation plate 20 is made of L-shaped aluminum and includes a longitudinal plate 21 and a transverse plate 22 which are mutually bent. The LED light bar 10 is attached to the inner surface of the longitudinal plate 21. The transverse plate 22 is opposite to the back surface of the light guide plate 1. A layer of back plate 2 may also be sandwiched between the transverse plate 22 and the light guide plate 1. The back plate 2 serves as one of the bearing structures of the light guide plate 1 to provide a certain back support force for the back plate 1. When the display device is hung on a transverse surface such as a wall, the longitudinal plate 21 of the heat dissipation plate 20 is transverse to the wall, the transverse plate 22 is transverse, and the longitudinal plate 21 serves as a carrier and a back frame of the display device.

Here, the longitudinal plate 21 and the transverse plate 22 of the heat dissipation plate 20 are perpendicular to each other. The hanger 30 includes a first hanger 31 for fixing on the hanging wall 5 and two second hangers 32 which are respectively fixed on the two ends of the first hanger 31 at intervals. The two second hangers 32 and the heat dissipation plate 20 are detachably connected by screwing, snap-fitting and the like. The heat dissipation mechanism 40 is fixed on the first hanger 31 and disposed between the two second hangers 32. The heat dissipation mechanism 40 is in contact with the back surface of the heat dissipation plate 20.

The heat dissipation mechanism 40 includes a plurality of heat dissipation fins 41, a heat dissipation fan 42, a second water cooling pipe 43, a third water cooling pipe 44. The heat dissipation fins 41 are in surface contact with the back of the heat dissipation plate 20. The heat dissipation mechanism 40 is fixed on the first hanger 31. The heat dissipation fins 41 surround the periphery of the heat dissipation fan 42. The heat dissipation fan 42 is configured to exhaust air away from the heat dissipation plate 20 so as to draw the heat generated in the heat dissipation mechanism 40 away from the display device.

The plurality of heat dissipation fins 41 and the heat dissipation plate 20 are arranged at an angle to the back of the heat dissipation plate 20 so that the heat dissipation area of the heat dissipation plate 20 obviously increases doubly. The heat dissipation fan 42 drains the heat radiation emitted from the heat dissipation fins 41 around the heat dissipation fan 42 to the air, so that the heat dissipation effect is very obvious. In the meantime, since the heat dissipation fan 42 and the heat dissipation fins 41 are both located in the hanger 30, the volume of the display device will not be increased. In addition, the volume of the main portion of the display device used for display remains ultra-thin and does not need to be supplemented with a large-size heat dissipation member.

As shown in FIG. 3, the wall-mounted heat dissipation mechanism further includes a first water cooling pipe 50 and a water pump 60 connected to each other, the first water cooling pipe 50 covers the surface of the longitudinal plate 21 facing away from the LED light bar 10, and the first water cooling pipe 50 curves back and forth to take the heat of the longitudinal plate 21 flowing through the cooling liquid when the water pump 60 supplies the cooling liquid. The heat dissipation mechanism 40 further includes a second water cooling pipe 43 and a third water cooling pipe 44, the second water cooling pipe 43 and the third water cooling pipe 44 are provided in the area between the two second hangers 32 in a reciprocating manner, respectively for conveying the high temperature cooling liquid from the longitudinal plate 21 side to the side of the first water cooling pipe 50 and for conveying the low temperature cooling liquid from the side of the first water cooling pipe 50 to the longitudinal plate 21 side. In the process of the water pump 60 working, since the water pump 60 is transported from the third water cooling pipe 44 to the first water cooling pipe 50 on the side of the longitudinal plate 21 through the low temperature cooling liquid, the cooling liquid flows through the first water cooling pipe 50 disposed on the back of the longitudinal plate 21 to take away the heat from the longitudinal plate 21, the cooling liquid with the increased temperature is further transported to the region having the heat dissipation fin 41 and the heat dissipation fan 42 through the second water cooling pipe 43. After the high temperature cooling liquid flows through the meandering second water cooling pipe 43 and the third water cooling pipe 44 between the heat dissipation fins 41, the heat is dissipated from the heat dissipation fins and further cooled and cooled by the heat dissipation fan, so as to form a cooler liquid with a lower temperature. The cooling liquid can be returned to the side of the first water cooling pipe for re-use, and the circulation can be realized, thereby realizing uninterrupted cooling of the cooling liquid.

As one of the embodiments, the second water cooling pipe 43 and the third water cooling pipe 44 are respectively introduced from the corresponding second hanger 32 near both sides and extend toward the middle portion, that is, from both ends of the first hanger 31 in the longitudinal direction, and extend towards the middle of the first hanger 31 respectively. The area of the heat dissipation fins 41 and the heat dissipation fan 42 provided is folded and folded repeatedly to cover as much as possible more heat dissipation area so as to achieve a better heat dissipation effect. The area between the two second hangers 32 may form a plurality of spaced apart sub-areas. Each sub-area has heat dissipation fins 41 and a heat dissipation fan 42 surrounded by the heat dissipation fins 41. Each of the heat dissipation fans 42 respectively dissipates the heat of the corresponding heat dissipation fin 41 by dissipating the heat of each of the sub-areas.

Figure 4:
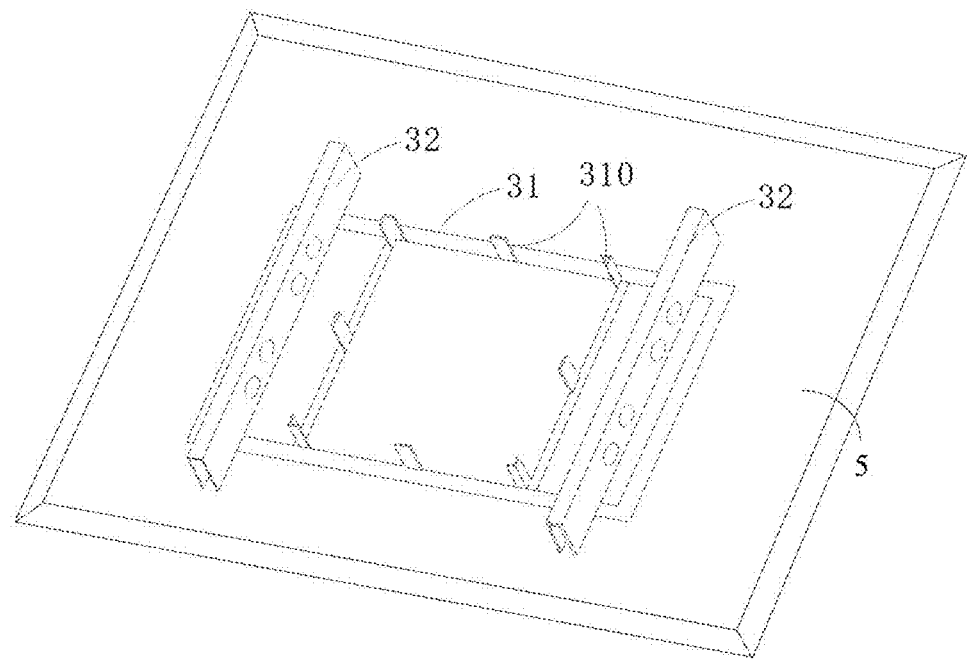
FIG. 4 is a schematic structural diagram of the hanger of the display device according to the embodiment of the present disclosure.

Specifically, each of the second hangers 32 can be provided with at least one row of screw holes for the screws to pass through, when the main portion of the display device is mounted on the hanger 30, the light guide plate 1, the heat dissipation plate 20, and the like of the main portion of the display device may be fixed to the second hangers 32 at both ends by screws, the second hangers 32, the first hanger 31, and the heat dissipation plate 20 are enclosed in a space for mounting the heat dissipation fins 41, the heat dissipation fan 42, the second water cooling pipe 43, the third water cooling pipe 44 and the like, do not need to reserve a variety of heat sink installation space, so take full advantage of the space. As shown in FIG. 4, a limit block 310 may be protrudedly disposed between the two second hangers 32 on the first hanger 31. The limit block 310 at the corner may be a corner block of L-shaped cross section, each of the limit blocks 310 encloses a rectangular mounting area so that the heat dissipation fins 41, the heat dissipation fan 42, and the like can be restricted therein without displacement parallel to the first hanger 31. The cooperation between the heat dissipation plate 20 and the first hanger 31 can ensure the mounting reliability perpendicular to the heat dissipation plate 20.

In summary, in the present disclosure, the bulky parts of the wall-mounted heat dissipation mechanism are integrated into the hanger structure of the display device, so that the space redundancy possessed by the hanger structure of the display apparatus itself is fully utilized. Without increasing the total volume of the entire display device, it not only places various large heat dissipation structures well, but also ensures that the display structure of the display device is slim and beautiful, and increases the competitiveness of the product.

The foregoing descriptions are merely specific implementation manners of the present application, it should be noted that those skilled in the art may make various improvements and modifications without departing from the principle of the present application, and these improvements and modifications should also be considered as falling within the protection scope of the present application.

What is claimed is:
1. A wall-mounted heat dissipation mechanism for a display device, wherein an LED light bar is disposed at a light incident end of a light guide plate and opposite to the light guide plate, and the wall-mounted heat dissipation mechanism comprises:
   a heat dissipation plate comprising a longitudinal plate and a transverse plate bended to each other, the LED light bar is attached to an inner surface of the longitudinal plate, and the transverse plate is arranged opposite to a back surface of the light guide plate;
   a hanger comprising a first hanger fixed on a hanging wall and two second hangers respectively fixed on two ends of the first hanger at intervals, the two second hangers are configured to detachably connect with the heat dissipation plate; and
   a heat dissipation mechanism fixed on the first hanger and disposed between the two second hangers, the heat dissipation mechanism being in surface contact with a back surface of the heat dissipation plate.

2. The wall-mounted heat dissipation mechanism for a display device according to claim 1, wherein the heat dissipation mechanism comprises a plurality of heat dissipation fins arranged at intervals, and the heat dissipation fins are in contact with the back surface of the heat dissipation plate.

3. The wall-mounted heat dissipation mechanism for a display device according to claim 2, wherein a portion of the first hanger on which the heat dissipation mechanism is fixed is hollowed out.

4. The wall-mounted heat dissipation mechanism for a display device according to claim 3, wherein the heat dissipation mechanism further comprises a heat dissipation fan for exhausting air in a direction away from the heat dissipation plate.

5. The wall-mounted heat dissipation mechanism for a display device according to claim 4, wherein the plurality of heat dissipation fins surround a periphery of the heat dissipation fan.

6. The wall-mounted heat dissipation mechanism for a display device according to claim 1, further comprising a first water cooling pipe and a water pump connected to each other, the first water cooling pipe is bent back and forth to cover a surface of the longitudinal plate facing away from the LED light bar and is configured to supply cooling liquid to flow through the longitudinal plate to take heat of the longitudinal plate away when the water pump supplying the cooling liquid.

7. The wall-mounted heat dissipation mechanism for a display device according to claim 6, wherein the heat dissipation mechanism further comprises a second water cooling pipe and a third water cooling pipe connected with the first water cooling pipe, the second water cooling pipe and the third water cooling pipe are reciprocally bent and disposed between the two second hangers, respectively for conveying high-temperature cooling liquid from a side of the longitudinal plate to a side of the first water cooling pipe, and for conveying low-temperature cooling liquid from the side of the first water cooling pipe to the side of the longitudinal plate.

8. The wall-mounted heat dissipation mechanism for a display device according to claim 7, wherein the second water cooling pipe and the third water cooling pipe respectively extend from a corresponding side of the second hanger near two sides thereof toward a middle portion thereof.

9. The wall-mounted heat dissipation mechanism for a display device according to claim 2, further comprising a first water cooling pipe and a water pump connected to each other, the first water cooling pipe is bent back and forth to cover a surface of the longitudinal plate facing away from the LED light bar and is configured to supply cooling liquid to flow through the longitudinal plate to take heat of the longitudinal plate away when the water pump supplying the cooling liquid.

10. The wall-mounted heat dissipation mechanism for a display device according to claim 9, wherein the heat dissipation mechanism further comprises a second water cooling pipe and a third water cooling pipe connected with the first water cooling pipe, the second water cooling pipe and the third water cooling pipe are reciprocally bent and disposed between the two second hangers, respectively for conveying high-temperature cooling liquid from a side of the longitudinal plate to a side of the first water cooling pipe, and for conveying low-temperature cooling liquid from the side of the first water cooling pipe to the side of the longitudinal plate.

11. The wall-mounted heat dissipation mechanism for a display device according to claim 10, wherein the second water cooling pipe and the third water cooling pipe respectively extend from a corresponding side of the second hanger near two sides thereof toward a middle portion thereof.

12. The wall-mounted heat dissipation mechanism for a display device according to claim 3, further comprising a first water cooling pipe and a water pump connected to each other, the first water cooling pipe is bent back and forth to cover a surface of the longitudinal plate facing away from the LED light bar and is configured to supply cooling liquid to flow through the longitudinal plate to take heat of the longitudinal plate away when the water pump supplying the cooling liquid.

13. The wall-mounted heat dissipation mechanism for a display device according to claim 12, wherein the heat dissipation mechanism further comprises a second water cooling pipe and a third water cooling pipe connected with the first water cooling pipe, the second water cooling pipe and the third water cooling pipe are reciprocally bent and disposed between the two second hangers, respectively for conveying high-temperature cooling liquid from a side of the longitudinal plate to a side of the first water cooling pipe, and for conveying low-temperature cooling liquid from the side of the first water cooling pipe to the side of the longitudinal plate.

14. The wall-mounted heat dissipation mechanism for a display device according to claim 13, wherein the second water cooling pipe and the third water cooling pipe respectively extend from a corresponding side of the second hanger near two sides thereof toward a middle portion thereof.

15. A display device, comprising a light guide plate, a LED light bar and a wall-mounted heat dissipation mechanism, wherein the LED light bar is disposed at a light incident end of the light guide plate and opposite to the light guide plate, the wall-mounted heat dissipation mechanism comprises:
   a heat dissipation plate comprising a longitudinal plate and a transverse plate bended to each other, the LED light bar is attached to an inner surface of the longitudinal plate, and the transverse plate is arranged opposite to a back surface of the light guide plate;
   a hanger comprising a first hanger fixed on a hanging wall and two second hangers respectively fixed on two ends of the first hanger at intervals, the two second hangers are configured to detachably connect with the heat dissipation plate; and
   a heat dissipation mechanism fixed on the first hanger and disposed between the two second hangers, the heat dissipation mechanism being in surface contact with a back surface of the heat dissipation plate.

16. The display device according to claim 15, further comprising a back plate, the back plate is sandwiched between the light guide plate and the transverse plate.

17. The display device according to claim 15, wherein the heat dissipation mechanism comprises a plurality of heat dissipation fins arranged at intervals and a heat dissipation fan for exhausting air in a direction away from the heat dissipation plate, the heat dissipation fins are in contact with the back surface of the heat dissipation plate, a portion of the first hanger on which the heat dissipation mechanism is fixed is hollowed out, and the plurality of heat dissipation fins surround a periphery of the heat dissipation fan.

18. The display device according to claim 17, wherein the wall-mounted heat dissipation mechanism further comprises a first water cooling pipe and a water pump connected to each other, the first water cooling pipe is bent back and forth to cover a surface of the longitudinal plate facing away from the LED light bar and is configured to supply cooling liquid to flow through the longitudinal plate to take heat of the longitudinal plate away when the water pump supplying the cooling liquid.

19. The display device according to claim 18, wherein the heat dissipation mechanism further comprises a second water cooling pipe and a third water cooling pipe connected with the first water cooling pipe, the second water cooling pipe and the third water cooling pipe are reciprocally bent and disposed between the two second hangers, respectively for conveying high-temperature cooling liquid from a side of the longitudinal plate to a side of the first water cooling pipe, and for conveying low-temperature cooling liquid from the side of the first water cooling pipe to the side of the longitudinal plate.

20. The display device according to claim 19, wherein the second water cooling pipe and the third water cooling pipe respectively extend from a corresponding side of the second hanger near two sides thereof toward a middle portion thereof.

* * * * *